United States Patent [19]

Lupke

[11] Patent Number: 4,534,923
[45] Date of Patent: Aug. 13, 1985

[54] METHOD AND APPARATUS FOR FORMING A DOUBLE WALLED THERMOPLASTIC TUBE WITH INTEGRAL BELLS

[76] Inventor: Manfred A. A. Lupke, 10 McLeary Ct., Concord, Ontario, Canada, L4K 2Z3

[21] Appl. No.: 548,453

[22] Filed: Nov. 3, 1983

[30] Foreign Application Priority Data

Dec. 2, 1982 [CA] Canada .................................... 416840

[51] Int. Cl.³ ...................... B29C 17/07; B29C 17/14; B29D 23/04
[52] U.S. Cl. ................................... 264/156; 138/121; 138/122; 138/148; 264/508; 264/167; 264/173; 425/503; 425/505; 425/133.1; 425/523; 425/532; 425/290
[58] Field of Search ............... 264/508, 150, 155, 156, 264/167, 173; 425/133.1, 134, 503, 504, 505, 112, 113, 523, 532, 539, 290, 325, 326.1; 138/121, 122, 148, 173

[56] References Cited

U.S. PATENT DOCUMENTS

| | | | |
|---|---|---|---|
| 2,898,941 | 8/1959 | Kilcup | 138/122 X |
| 3,286,305 | 11/1966 | Seckel . | |
| 3,743,457 | 7/1973 | Cini . | |
| 3,859,025 | 1/1975 | Maroschak . | |
| 3,897,090 | 7/1975 | Maroschak . | |
| 4,305,703 | 12/1981 | Lupke et al. | 425/133.1 X |
| 4,428,591 | 1/1984 | Marissen et al. | 138/148 X |

FOREIGN PATENT DOCUMENTS 1083766 8/1980 Canada .
2409020 9/1975 Fed. Rep. of Germany ...... 264/508

Primary Examiner—Jan Silbaugh

[57] ABSTRACT

Double walled thermoplastic tubes, with corrugated outer walls and smooth inner wall are formed with integral bell sections spaced along the tube. The outer, corrugated wall is formed with a bell section. One of the walls is pierced between the ends of the bell section to allow the escape of air, and the inner wall is pressed outwards into engagement with the bell section of the outer wall.

10 Claims, 4 Drawing Figures

FIG.1

METHOD AND APPARATUS FOR FORMING A DOUBLE WALLED THERMOPLASTIC TUBE WITH INTEGRAL BELLS

One aspect of the present invention is a method of forming a double walled thermoplastic tube by extruding a first tube into a travelling mold, molding the first tube in the mold to form a corrugated outer wall, and extruding a second tube into the first tube to form a smooth inner wall.

This method is disclosed in, for example, Canadian Pat. No. 1,083,766 issued Aug. 19, 1980 to G. P. H. Lupke and M. A. A. Lupke. The tube produced by this method has many uses particularly where light weight and high compression strength are desired. It would be of advantage to be able to make the tube with integral bells at selected points. While it is known to form integral bells in a single-walled tube, no method has yet been proposed for doing so with the double-walled tube. This aspect of the invention aims at a solution to this problem.

According to this aspect of invention the method of forming the doube walled tube is characterized by the steps of:

molding integral bell sections into the outer wall; piercing one of the tubes between the ends of each outer wall bell section so as to allow the escape of air from between the inner and outer walls; and pressing the inner wall into continuous contact with the outer wall along each outer wall bell section to form a double walled bell section.

Another aspect of the present invention is a tube formed according to the above method.

According to this second aspect, the present invention provides a double walled thermoplastic tube with a corrugated outer wall and a smooth inner wall and characterized by integral double walled bells interposed in the tube.

A further aspect of the present invention is an apparatus for manufacturing the belled tube.

According to this further aspect, the present invention provides an apparatus for forming a double walled thermoplastic tube with a corrugated outer wall and a smooth inner wall, the apparatus including a travelling mold with a corrugated cavity, extruder means for extruding a first tube into the mold cavity and a second tube into the first tube, means for molding the first tube to form a corrugated outer wall and means for forming the second tube into a smooth inner wall, the apparatus being characterized by means for forming integral bells in the double walled tube, comprising the combination of:

means for molding integral bell sections into the outer wall; piercing means for piercing one of the tubes between the ends of each outer wall bell section; and pressing means for pressing the inner wall into continuous contact with each bell section of the outer wall.

In the accompanying drawings, which illustrate exemplary embodiments of the present invention:

Figure 1:
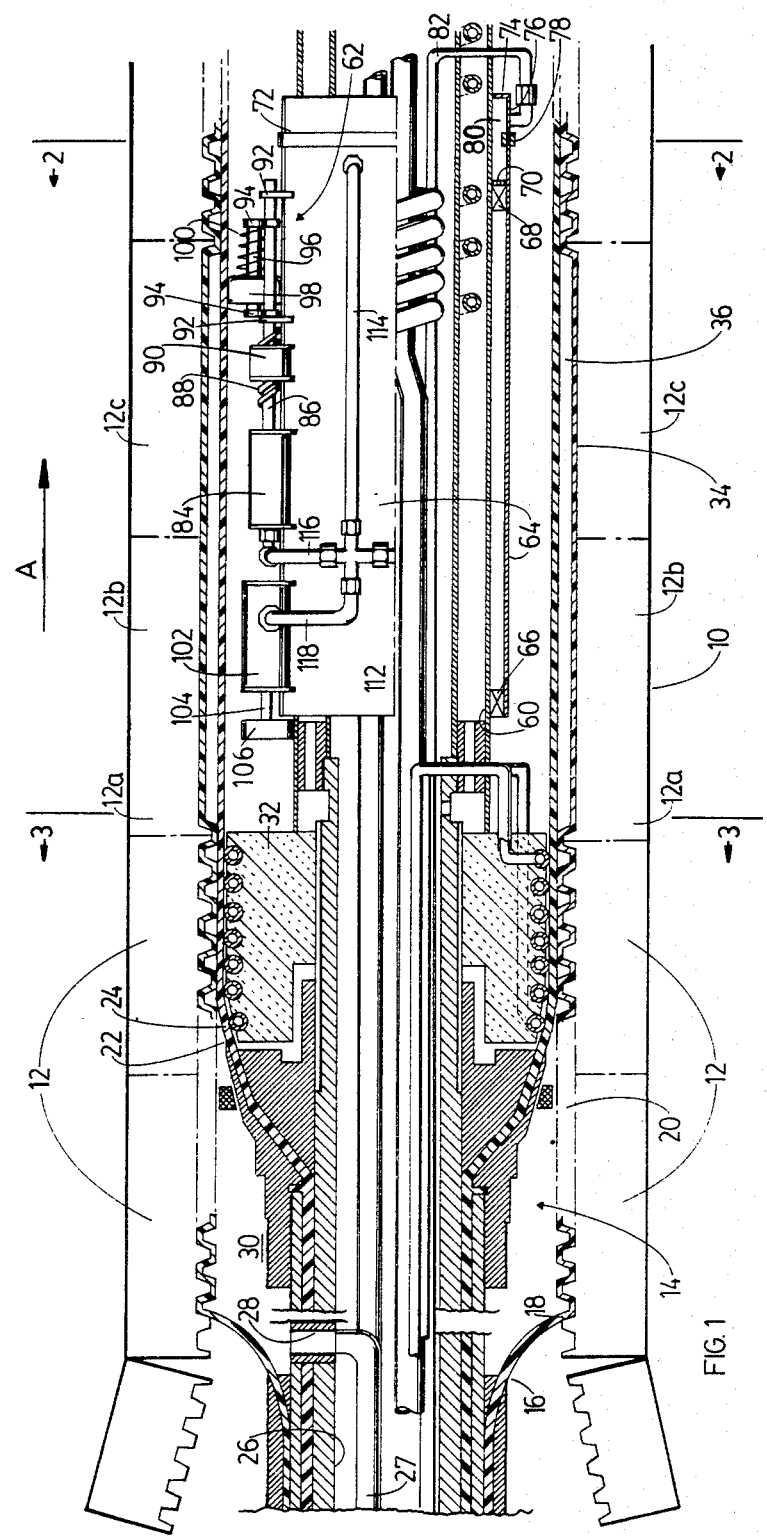
FIG. 1 is a longitudinal section of apparatus for forming a double walled thermoplastic tube, including a bell forming section according to the present invention.
Figure 2:
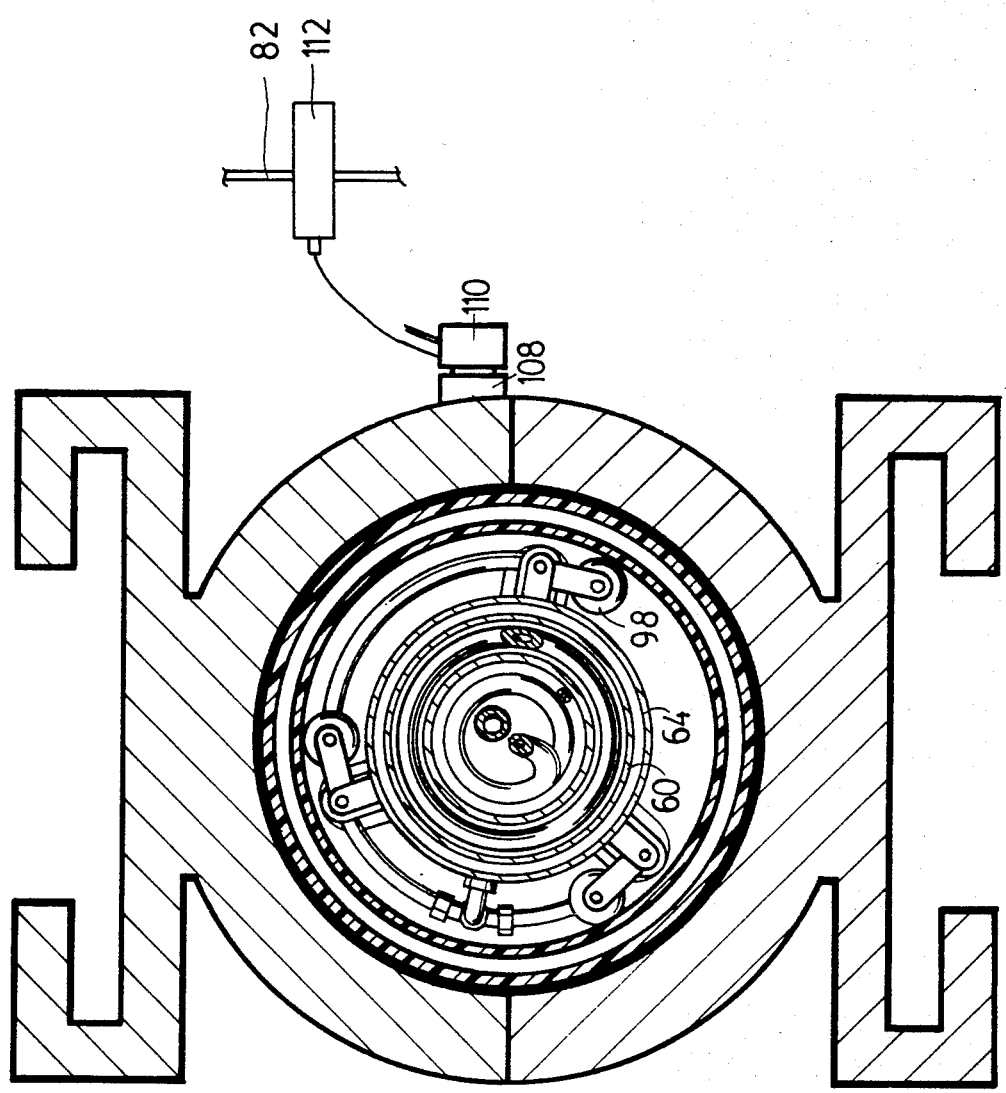
FIG. 2 is a section along line 2—2, FIG. 1.
Figure 3:
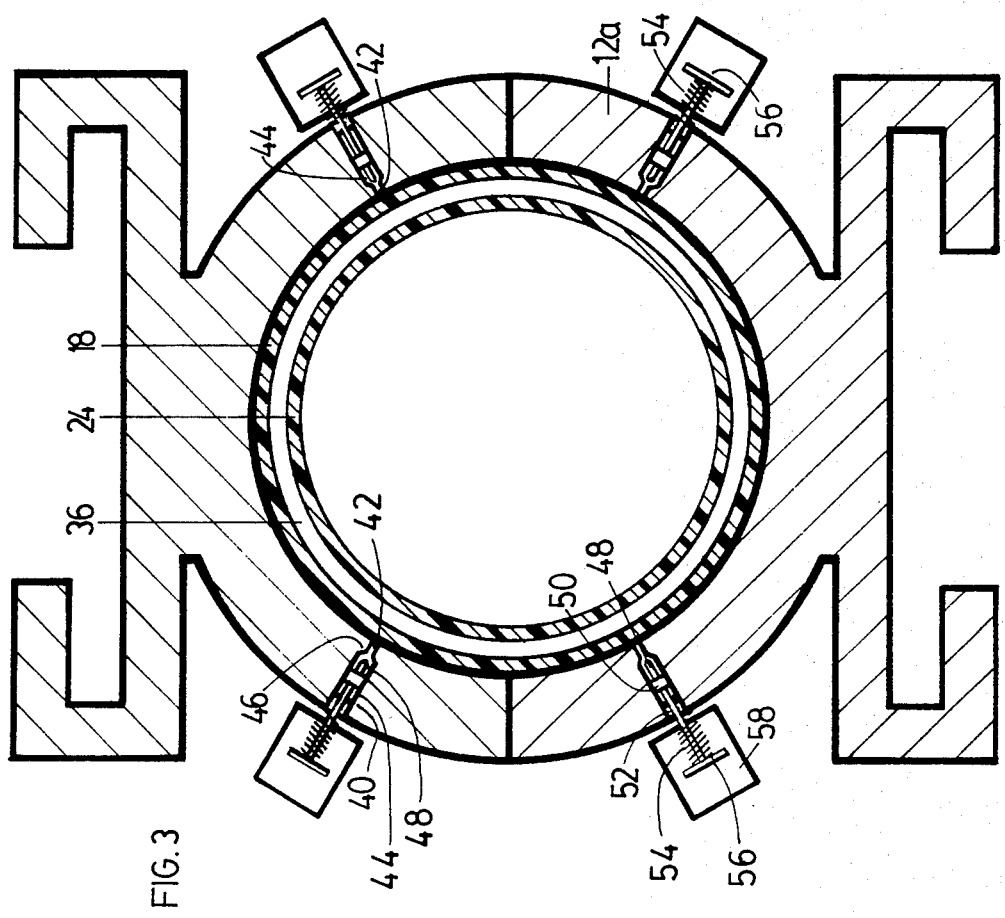
FIG. 3 is a section along line 3—3 of FIG. 1.

Referring to the drawings, and particularly to FIGS. 1, 2 and 3, the illustrated apparatus includes a travelling mold 10 advancing in the direction of arrow A. In this embodiment, the mold consists of two sets of mold blocks 12, circulating on respective paths as described, for example, in the previously referred to Canadian Pat. No. 1,083,766. This type of mold is not essential, however, and other embodiments of the invention may employ other forms of mold. For example, some of the molds described in U.S. Pat. No. 4,292,014 of M. A. A. Lupke and G. P. H. Lupke are suitable.

The mold 10 is associated with an extrusion die 14 with an upstream annular orifice 16 for extruding a first, outer tube 18 into the corrugated mold cavity 20 of the mold. The die has an additional downstream orifice 22 for extruding a second, inner tube 24 into the outer tube.

The die is also provided with a central core pipe 26. Pressurized air may be supplied through a pipe 27 running along the core pipe 26 and a radial passage 28 to a chamber 30 inside the outer tube 18, upstream of the downstream die orifice 22. This high pressure air serves to blow mold the outer tube into the mold cavity 20.

Downstream of orifice 22, the die carries a mandrel 32 with a ribbed, cooled outer surface. A mandrel of this type is described in Canadian Pat. No. 1,172,813 filed June 16, 1982 by M. A. A. Lupke and G. P. H. Lupke. The mandrel presses the inner tube 24 against the corrugated outer tube to fuse the tubes into a double walled tube with a corrugated outer wall and a smooth inner wall.

At selected points along the travelling mold, the mold blocks are shaped to form the outer wall into a bell. In FIG. 1, moldblocks 12a, 12b and 12c are shown as providing an enlarged diameter, smooth walled bell section 34 of the mold cavity 20. The outer tube 18 is molded into this bell section and the inner wall extends along the inside of the bell, between the bases of the corrugations on either end, to form a closed annular chamber 36 between the two walls.

As illustrated in FIG. 3, each mold block 12a at the upstream end of the bell cavity 34 has radial through bores 40, each including a short, small diameter section 42 at the inner end and a larger diameter section 44 extending to the outer face of the block. Between the two sections 42 and 44, there is a tapered transition section 46.

A pin 48 extends along each bore 40 and is guided for movement in the bore by a collar 50 carried by the pin and a bushing 52 at the outer end of the bore section 44. The pin is biassed outwardly by a coil spring 54 retaining between an enlarged head 56 on the pin and the mold block. In the normal, outer position of the pin, its tip is out of the small end section 42 of the bore 40 to allow air flow into the bore from the mold cavity. The bore 40 is in turn vented to the atmosphere by passages through the collar 50 and the bushing 52 (not shown).

The position of each pin 48 in bore 40 is controlled by a cam 58 fixed to the machine frame so as to engage the head 56 of the pin and to push the pin inwardly through the bore section 42 to pierce the outer wall 18 of the molded tube at the upstream end of the bell cavity 34. The pin is then withdrawn to vent the chamber 36 between the two tubes in the bell cavity.

Returning to FIG. 1, pipe 60 is shown extending along the mold cavity downstream from the mandrel 32. This pipe serves as part of a tube cooling system, such as the described in Canadian Pat. No. 1,172,813, which is referred to above. In the present case, the pipe 60 carries a tube pressing means 62 for pressing the inner tube outwardly against the outer tube in the bell cavity 34 of the mold.

The pressing means 62 includes a sleeve 64 mounted on the outside of pipe 60 by two bearings 66 and 68. The downstream bearing 68 is provided with an air seal 70 for reasons that will presently be described. A ring 72 of L-shaped cross section has its radial flange 74 fixed to the pipe 60 downstream of sleeve 64 and its axially extending flange 76 aligned with and confronting the end of sleeve 64. A rotary seal 78 joins the downstream end of sleeve 64 and the flange 76 of ring 72 to form a plenum chamber 80 downstream of air seal 70. The plenum chamber is supplied with pressurized air through a tube 82 coupled to the ring 72 and extending along pipes 60 and 26 to the extrusion die.

The sleeve 64 carries an air operated cylinder 84 with an elongated piston rad 86 extending parallel to the sleeve 64. The rod has a long pitch lead screw section 88 extending through a nut 90 mounted on the sleeve 64 downstream of the cylinder. Downstream of the nut 90, the piston rod extends through spaced supports 92, also fixed to the sleeve 64. Between the supports 92, the rod carries parellel crank arms 94 and a shaft 96 parallel to the rod. As shown in FIG. 1 the arms 94 are more closely spaced than supports 92, to allow axial movement of the rod 86. A roller 98 is rotatable on the shaft 96 and is biassed towards the upstream end of the shaft by a coil spring 100 extending between the roller and the downstream crank arm 94.

As illustrated in FIG. 2, the sleeve 64 carries two additional pressers identical to that constituted by cylinder 84, nut 90 and roller 98 but spaced 120° around the sleeve from the presser illustrated in FIG. 1.

At the upstream end of sleeve 64 is an air motor 102 with an output shaft 104 overhanging the end of the sleeve and carrying a drive wheel 106 that engages the outer surface of pipe 60. The motor, when driven, rotates the sleeve counter-clockwise as seen in FIG. 2.

As illustrated in FIG. 2, the bell forming mold blocks 12a, 12b and 12c are formed with lugs 108 along one side that engage a microswitch 110 carried on the machine frame. The switch is so positioned that when it is first engaged by the lug on mold block 12c, the roller 98 is at the downstream end of bell cavity 34. The switch actuates a solenoid valve 112 to connect a source of pressurized air(not shown) to the cylinder 84 and the air motor 102 through line 82, plenum 80 and lines 114,116 and 118, connecting the plenum to the cylinders and motor (see FIG. 1). This begins rotation of the sleeve 64 and the assemblies carried by it, and extends the rod 86. The thread on rod 86 co-operates with nut 90 to rotate the rod counter-clockwise as seen in FIG. 2, thus swinging the roller 98 outwardly to press the inner tube 24 into contact with the outer tube to fuse the two hot pipes. Continued movement of the mold 10 and rotation of the sleeve 64 provides for continuous engagement of the tubes along the bell section 34 of the mold cavity.

The spring 100 allows some axial movement of the roller 98 upon engagement of the roller with the axially moving inner tube, to minimize slipping of the roller over the inner tube.

Figure 4:
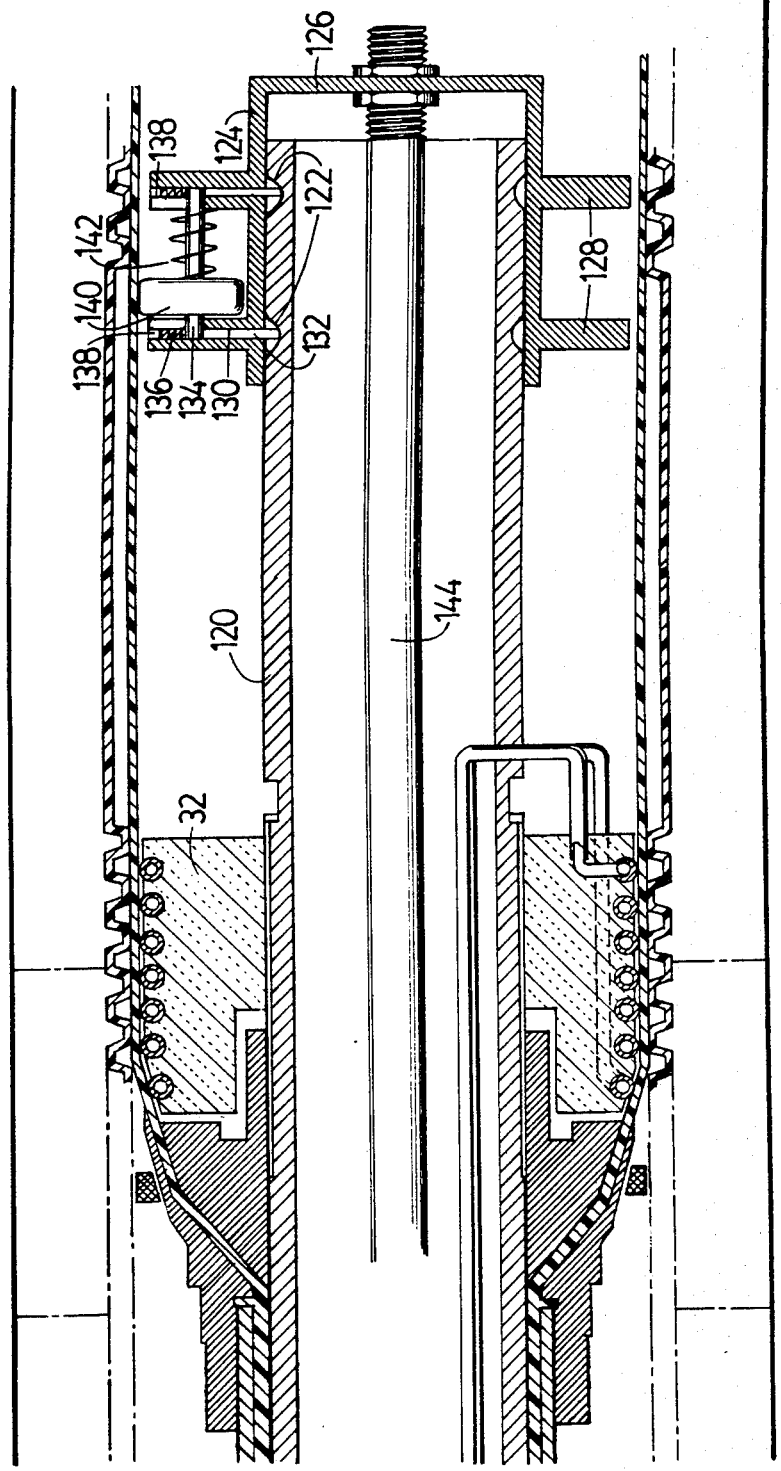
FIG. 4 is view like FIG. 1 illustrating another embodiment of the bell-forming section.

FIG. 4 illustrates an embodiment of the bell forming apparatus that may be used where the tube cooling system illustrated in FIG. 1 is not employed. In this embodiment, the mandrel 32 has a downstream tubular extension 120 with two annular cam grooves 122 in its outer surface, adjacent the downstream end. An annular sleeve 124 with a circular end flange 126 extends over the end of extension 120 and over the cam grooves 122. The sleeve carries two radial flanges 128 at a spacing corresponding to the spacing of grooves 122. A radial bore 130 extends through each flange 128 and the sleeve 124 in alignment with a respective one of the grooves 122. A plunger 132 is fitted in each bore 130 and rides in the associated groove 122.

At the outer end of each bore, the flange 128 is slotted to accept the end of a shaft 134 riding on the top of the plunger 132. The shaft and the plunger are biassed inwardly by a coil spring 136 in each bore 130 above the shaft. The spring is held in place by an end plug 138.

A roller 140 and a coil spring 142 are carried by the shaft 134, in the manner of roller 98 and spring 100 on 96 in FIGS. 1 and 2.

A rod 144 extends axially along the tubular extension 120 and is fixed to the centre of end flange 126. Rotation of the rod rotates the sleeve 124 and the roller carried by it. Upon axial movement of the rod, the plungers 132 ride up the sides of the grooves 122 and move the shaft 134 and roller 140 outwardly to press the inner tube into engagement with the outer tube in the bell cavity 34. The rod 144 may be rotated continuously or only during bell formation, as desired. Axial movement is effected adjacent to the extrusion die, under the control of a microswitch arrangement as in the embodiment of FIGS. 1 to 3, or some analogous control.

As with the embodiment of FIG. 1, the mold blocks 12a carry piercing pins for piercing the outer tube and allowing the escape of air from chamber 36.

While two particular embodiments of the invention have been described, it is to be understood that others are possible within the scope of the present invention. Thus, while it is the outer tube that is pierced in the illustrated embodiments, it is also possible to pierce the inner tube with a tool carried by the mandrel, or a mandrel extension. The tubes may be pierced at locations other than the upstream end of the bell cavity. The piercing location or locations will be dictated to a large extent by the arrangement of the presser, since at least one opening should be provided in the last section of the chamber 36 to be closed, to ensure complete evacuation. Presses other than those described here may be used, for example an inflatable sleeve like that described in U.S. patent application Ser. No. 427,623, filed 29th Sept. 1982 by M. A. A. Lupke and G. P. H. Lupke, and now abandoned.

It is also possible to use other forms of piercing tools, for example a hollow needle that is supported throughout its length in a bore in the mold block.

The embodiments of the invention in which an exclusive property or privelidge claimed are defined as follows:

1. A method of forming a double walled thermoplastic tube by extruding a first tube into travelling mold, molding the first tube in the mold to form a corrugated outer wall, and extruding a second tube into the first tube to form a smooth inner wall, the method being characterized by the steps of:

molding integral bell sections into the outer wall;
 piercing one of the tubes between the ends of each outer wall bell section so as to allow the escape of air from between the inner and outer walls; and
 pressing the inner wall into continuous contact with the outer wall along each outer wall bell section.

2. A method according to claim 1 characterized by piercing one of the walls adjacent the upstream end of each bell section.

3. A method according to claim 2 characterized in that the inner wall is first pressed against the outer wall adjacent the downstream end of each bell section and then progressively towards the upstream end as the bell section progresses with the travelling mold.

4. An apparatus for forming a double walled thermoplastic tube with a corrugated outer wall and a smooth inner wall, the apparatus including a travelling mold with a corrugated cavity, extruder means for extruding a first tube into the mold cavity and a second tube into the first tube, means for molding the first tube to form a corrugated outer wall and means for forming the second tube into a smooth inner wall, the apparatus being characterized by means for forming integral bells in the double walled tube, comprising the combination of:
  means for molding integral bell sections into the outer wall;
  piercing means for piercing one of the tubes between the ends of each outer wall bell section; and
  pressing means for pressing the inner wall into continuous contact with each bell section of the outer wall.

5. Apparatus according to claim 4 characterized in that the piercing means are located adjacent the upstream end of each bell section.

6. Apparatus according to claim 5 characterized in that the pressing means comprise a presser at a fixed distance along the mold cavity from the extruder means and presser actuating means for moving the presser outwardly into engagement with the inner tube as the downstream end of a bell section passes the presser.

7. Apparatus according to claim 6 characterized in that the presser actuating means also includes means for rotating the presser about the interior of the second tube.

8. Apparatus according to claim 7 characterized in that the presser comprises a roller.

9. Apparatus according to claim 8 characterized in that the presser actuating means are pneumatically operated.

10. Apparatus according to claim 8 characterized in that the presser actuating means comprise:
  a rod extending from the extruder means to the pressing means and connected to the pressing means such that rotation of the rod rotates the presser, and axial movement of the rod displaces the presser along the mold cavity; and cam means engaging the presser to displace the roller outwardly upon axial movement of the presser.

* * * * *